US008605157B2

(12) United States Patent
Kobayashi

(10) Patent No.: US 8,605,157 B2
(45) Date of Patent: Dec. 10, 2013

(54) VIDEO DISPLAY APPARATUS AND AFTERIMAGE CORRECTING METHOD

(75) Inventor: Michio Kobayashi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 87 days.

(21) Appl. No.: 12/998,753

(22) PCT Filed: Dec. 25, 2008

(86) PCT No.: PCT/JP2008/073604

§ 371 (c)(1), (2), (4) Date: May 27, 2011

(87) PCT Pub. No.: WO2010/073341

PCT Pub. Date: Jul. 1, 2010

(65) Prior Publication Data

US 2011/0234814 A1 Sep. 29, 2011

(51) Int. Cl.
*H04N 5/57* (2006.01)

(52) U.S. Cl.
USPC .......... 348/189; 348/687

(58) Field of Classification Search
USPC .......... 348/189, 687
See application file for complete search history.

(56) References Cited

U.S. PATENT DOCUMENTS 5,748,171 A 5/1998 Ishizaki et al.
6,160,534 A 12/2000 Katakura
6,987,500 B2 1/2006 Morita et al.
2003/0146892 A1 8/2003 Morita et al.
2004/0051692 A1* 3/2004 Hirakata et al. .......... 345/102
2005/0017989 A1* 1/2005 Huang .......... 345/690
2005/0057546 A1* 3/2005 Shibutani .......... 345/204
2005/0168490 A1* 8/2005 Takahara .......... 345/690
2008/0042953 A1* 2/2008 De Haan et al. .......... 345/89

FOREIGN PATENT DOCUMENTS

CN 1848234 A 10/2006
JP 1-281497 A 11/1989
JP 2-092174 A 3/1990
JP 5-241125 A 9/1993
JP 7-143483 6/1995
JP 9-016130 A 1/1997
JP 11-161244 A 6/1999
JP 2003-234980 A 8/2003
JP 2003-295839 A 10/2003

OTHER PUBLICATIONS

Chinese Office Action dated Jan. 28, 2013 with English translation.

* cited by examiner

*Primary Examiner* — Jefferey Harold
*Assistant Examiner* — Justin Sanders
(74) *Attorney, Agent, or Firm* — McGinn IP Law Group, PLLC

(57) ABSTRACT

To provide a video display apparatus and an afterimage correcting method for solving the problem of image quality degradation. Removing unit 2 removes DC components from the video signal received by input terminal 1. Integrating unit 3 integrates the video signal with DC components removed by removing unit 2 to generate an integration signal. Subtracting unit 4 subtracts the integration signal generated by integrating unit 3, from the video signal received by input terminal 1.

10 Claims, 5 Drawing Sheets

VIDEO DISPLAY APPARATUS AND AFTERIMAGE CORRECTING METHOD

TECHNICAL FIELD

The present invention relates to a video display apparatus and an afterimage correcting method, in particular, relating to a video display apparatus including an afterimage correcting circuit for electrically connecting afterimages that arise by displaying an image for long time, as well as an afterimage correcting method.

BACKGROUND ART

In video display apparatuses, there may occur a phenomenon in which an image remains on the screen as an afterimage.

In CRT displays and plasma displays, the deterioration rate of the fluorescent substance attached to the display is different depending on the brightness of the image. Therefore, if an identical image is displayed for a long time, some parts degrade fast and other parts degrade slowly. The part that degrades fast and the part that degrades slowly produce a difference in brightness, and this difference in brightness generates an afterimage on the screen. This afterimage is called burn-in.

On the other hand, in liquid crystal displays, differing from the burn-in, there occurs a phenomenon in which an afterimage continues to remain on the screen for a long time if an identical image has displayed for a long period.

Since, in a liquid crystal display, video signals are applied to the liquid crystal in the form of alternating current, normally, a voltage having a waveform that is symmetrical on both the positive and negative sides is applied.

However, the potential of a pixel electrode may deviate from the potential of the signal line through which the video signal is supplied to the pixel electrode, due to the parasitic capacitance occurring between the gate electrode and the source electrode of the TFT (Thin Film Transistor) of the pixel and the retention capacitance for retaining the voltage applied to the pixel electrode. This deviation of potential differs depending on the amplitude of the video signal.

If the potential of the pixel electrode deviates from the potential of the signal line, a DC offset occurs in the liquid crystal, so that the voltage applied to the liquid crystal deviates from the waveform that is symmetrical on the negative and positive sides. In this case, it is possible to correct the voltage to be applied to the liquid crystal to that of a waveform substantially symmetrical on the positive and negative sides if a DC (direct current) component is added to the video signal to cancel the DC offset. However, since the capacitance of the liquid crystal varies in accordance with the amplitude of the video signal due to dielectric anisotropy of the liquid crystal, it is impossible to correct the voltage applied to the liquid crystal to that of a perfect symmetric waveform on the positive and negative sides.

If the voltage applied to the liquid crystal deviates from a symmetric waveform, impurities (especially, ions) solved in the liquid crystal adhere to one of the electrodes for the liquid crystal so as to generate an electric field inside the liquid crystal.

If an unvaried image is displayed for long, the deviation of the voltage applied to the liquid crystal from a symmetrical waveform is retained, so that the amount of impurities adhering to the electrode for the liquid crystal increases, resulting in generation of a stronger electric field inside the liquid crystal. This electric field will produce an afterimage.

In this way, in video display apparatuses, if an identical image is displayed for long, the phenomenon in which an afterimage remains on the screen for a long time will occur although the generation mechanism is different between the CRT display and plasma display, and the liquid crystal display.

As technologies for reducing generation of afterimages in video display apparatuses, a video signal processing circuit is disclosed in Patent Document 1 and a liquid crystal device is disclosed in Patent Document 2.

In these inventions, the video signal is integrated so that an afterimage signal that represents the video image remaining on the screen as an afterimage is acquired. Then this afterimage signal is subtracted from the video signal.

Since this enables implementation of afterimage correction to the video image so as to cancel out the afterimage, it is possible to reduce afterimages arising in the video display apparatus.

Patent Document 1: JPH02-092174A

Patent Document 2: JP2003-234980A

DISCLOSURE OF THE INVENTION

Problems to be Solved by the Invention

The video signal includes a DC component for adjusting the brightness of the whole screen. Since the afterimage corresponding to this DC component produces a uniform image in brightness, human being will not notice this.

In the video signal processing circuit described in Patent Document 1 and the liquid crystal display device described in Patent Document 2, if the video signal includes a DC component, the video signal is integrated as a whole to produce an afterimage signal. Accordingly, the afterimage signal includes the component that will not be noticed as an afterimage, and the component that will not be noticed as an afterimage is also subtracted from the video signal.

As a result, afterimage correction is performed for the component that will not be noticed as an afterimage, hence this causes overcorrection, posing an image quality degradation problem. For example, there may occur a case in which overcorrection takes place and afterimage becomes even more distinct.

The object of the present invention is to provide a video display apparatus and afterimage correcting method for solving the above problem, or for solving the image quality degradation problem.

Means for Solving the Problems

The video display apparatus of the present invention includes: an input means receiving a video signal; a removing means removing DC components from the video signal received by the input means; an integrating means generating an integration signal by integrating the video signal with DC components removed by the removing means; a subtracting means subtracting the integration signal generated by the integrating means, from the video signal received by the input means; and a display means displaying video in accordance with the video signal undergoing subtraction at the subtracting means.

The afterimage correcting method is an afterimage correcting method implemented by a video display apparatus, comprising the steps of: receiving a video signal; removing DC components from the received video signal; generating an integration signal by integrating the video signal after removal; subtracting the generated integration signal from the received video signal; and displaying video in accordance with the video signal after subtraction.

Effect of the Invention

According to the present invention, it is possible to suppress degradation of image quality.

EXEMPLARY EMBODIMENTS FOR CARRYING OUT THE INVENTION

Exemplary Embodiments

Next, the exemplary embodiments of the present invention will be described with reference to the drawings.

Figure 1:
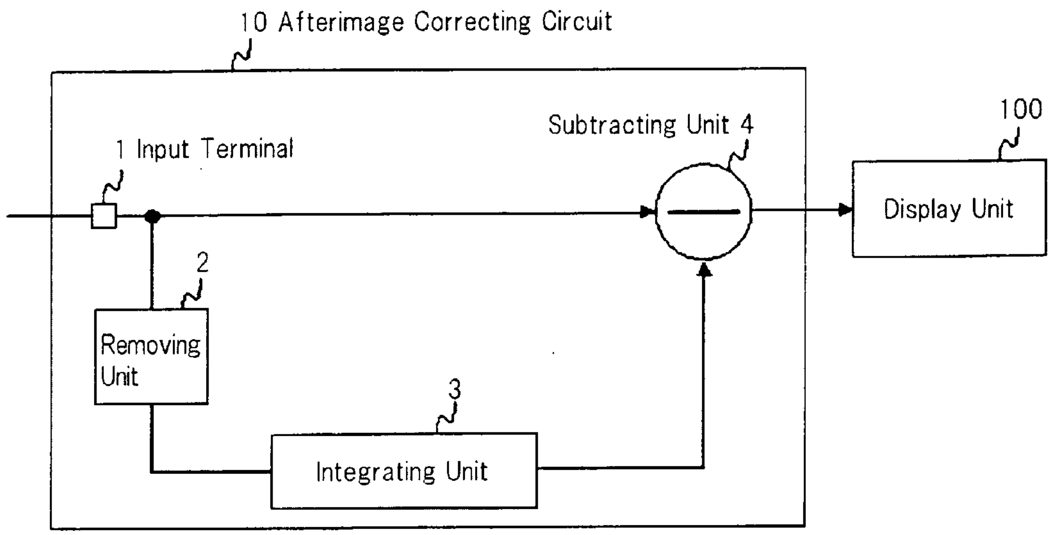
FIG. 1 is a block diagram showing a configuration of a video display apparatus according to the first exemplary embodiment of the present invention.

FIG. 1 is a block diagram showing a configuration of a video display apparatus according to the first exemplary embodiment of the present invention.

In FIG. 1, the video display apparatus includes afterimage correcting circuit 10 and display unit 100. Image correcting circuit 10 includes input terminal 1, removing unit 2, integrating unit 3 and subtracting unit 4.

Input terminal 1 receives a video signal. The video signal contains a DC (direct current) component and an AC (alternating current) component. The DC component is a component that adjusts the brightness of the whole screen and a component that is not noticed as an afterimage.

Removing unit 2 removes the DC component from the video signal received by input terminal 1. For example, removing unit 2, first, calculates the average value of the brightness of the video signal every one frame period. Then, removing unit 2 subtracts the average value from the video signal for so as to remove the DC component from the video signal. Here, one frame period corresponds to the duration in which one image frame is displayed.

Integrating unit 3 generates an integration signal by integrating the video signal with DC components removed by removing unit 2. For example, integrating unit 3 integrates the video signal by summing the video signal for every frame period.

Subtracting unit 4 subtracts the integration signal generated by integrating unit 3 from the video signal received by input terminal 1 to output the video signal with the integration signal subtracted therefrom.

Display unit 100 is a liquid crystal panel, plasma display panel, CRT or the like, for example. Display unit 100 displays images in accordance with the video signal output from subtracting unit 4.

Here, it is possible to provide, between input terminal 1 and subtracting unit 4, a delay circuit that delays the video signal by the time taken to remove unit 2 and integrating unit 3, or a delay circuit that delays time such that the integration signal generated during a certain frame period is subtracted from the video signal of the next frame period.

Figure 2:
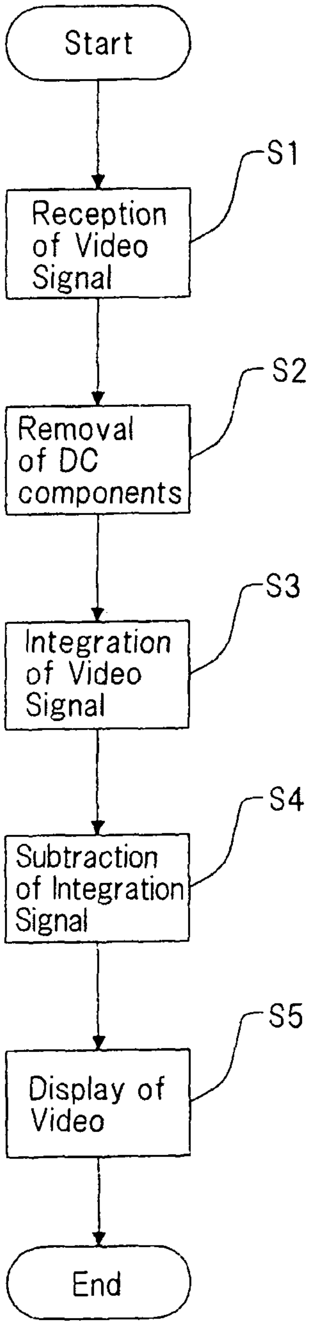
FIG. 2 is a flow chart for explaining an operational example of a video display apparatus of the first exemplary embodiment of the present invention.

Next, the operation will be described. FIG. 2 is a flow chart for explaining an operational example of the video display apparatus of the present exemplary embodiment.

Input terminal 1, as receiving a video signal, outputs the video signal to removing unit 2 and subtracting unit 4 (Step S1).

Removing unit 2, which receiving the video signal, calculates the average value of the brightness of the video signal. Removing unit 2 removes the DC component from the video signal by subtracting the average value from the video signal and outputs the video signal with DC components removed to integrating unit 3 (Step S2).

Integrating unit 3, which receiving the video signal, integrates the video signal to generate an integration signal and outputs the integration signal to subtracting unit 4 (Step S3).

Subtracting unit 4, which receiving the integration signal and video signal, subtracts the integration signal from the video signal, and outputs the video signal with the integration signal subtracted (Step S4).

Display unit 100, which receiving the video signal, displays an image in accordance with the video signal (Step S5).

Next, the effect will be described.

According to the present exemplary embodiment, removing unit 2 removes the DC component from the video signal received by input terminal 1. Integrating unit 3 integrates the video signal with DC components removed to generate an integration signal. Subtracting unit 4 subtracts the integration signal generated by integrating unit 3 from the video signal received by input terminal 1.

In this case, the integration signal is generate by integrating the video signal with DC components that have been removed. Then, the integration signal is subtracted from the video signal. Here, the DC component contained in the video signal is the component that is not recognized as an afterimage.

As a result, it is possible to inhibit subtraction of the component that is not recognized as an afterimage, from the video signal. Accordingly, it is possible to suppress occurrence of overcorrection, hence inhibit degradation of image quality.

Next, the second exemplary embodiment will be described. Here, components having the same functions as those in the first exemplary embodiment are allotted with the same reference numerals, hence description may be omitted.

Figure 3:
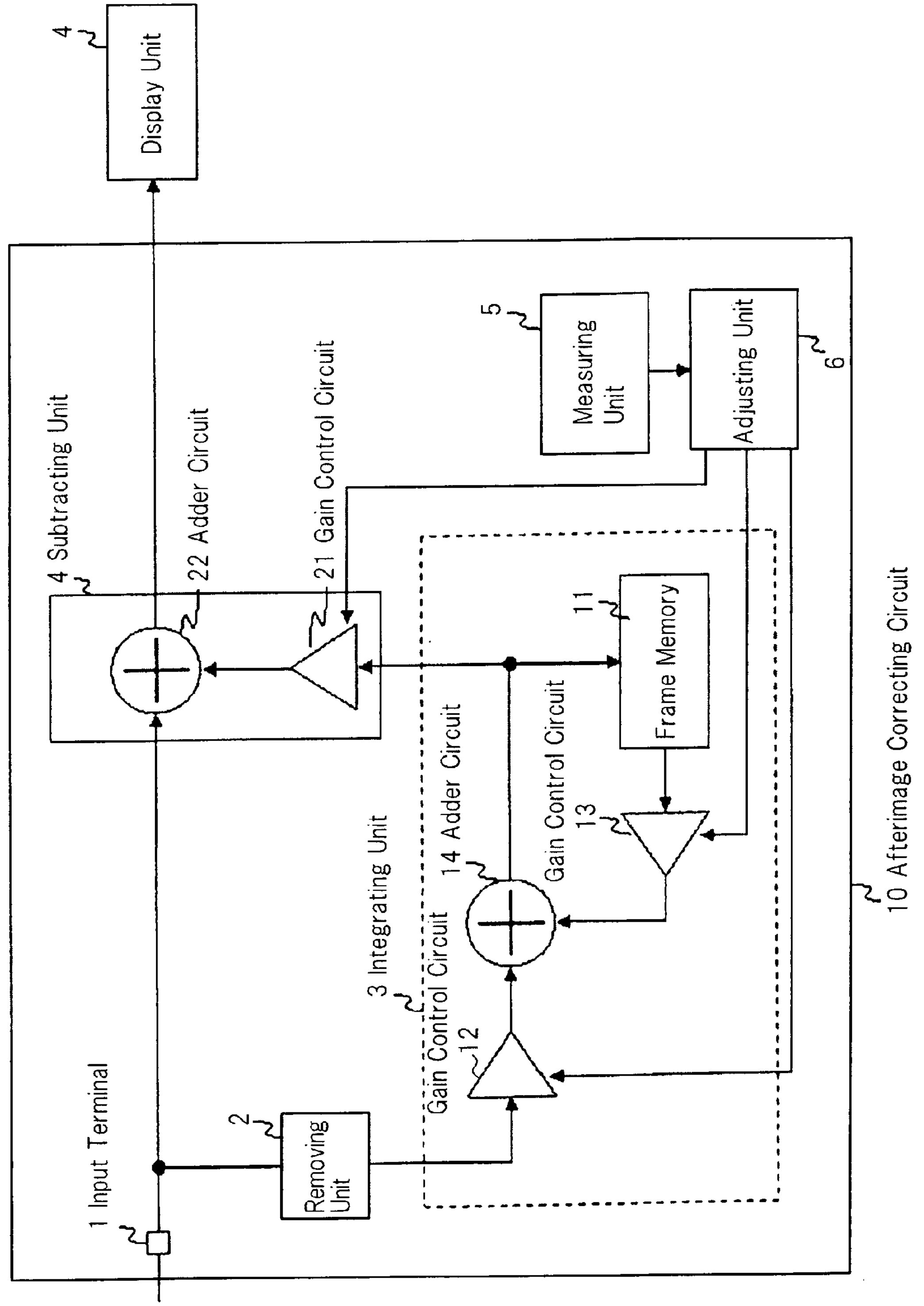
FIG. 3 is a block diagram showing a configuration of a video display apparatus according to the second exemplary embodiment of the present invention.

FIG. 3 is a circuit diagram showing a configuration of a video display apparatus of the present exemplary embodiment. In FIG. 3, the video display apparatus includes afterimage correcting circuit 10 and display unit 100.

Afterimage correcting circuit 10 includes input terminal 1, removing unit 2, integrating unit 3, subtracting unit 4, measuring unit 5 and adjustment unit 6.

Integrating unit 3 includes frame memory 11, an adjustment unit having gain control circuits 12 and 13 and adder circuit 14.

Frame memory 11 is an embodiment of a holding means. Frame memory 11, which receives a video signal as an input signal, holds the input video signal in a predetermined period of time and then outputs the signal. In the present exemplary embodiment, the predetermined period of time in which frame memory 11 holds the video signal is set to be one frame period.

In this way, the output signal from integrating unit 3 is renewed for every frame. Here, it is preferable that frame memory 11 holds the video signal at a resolution equal to or greater than that of display unit 100.

Gain control circuits 12 and 13 are set with respective parameters. In the present exemplary embodiment, gain control circuit 12 is set with a parameter α while gain control circuit 13 is set with a parameter (1−α). Here, parameter α satisfies $0 \leq \alpha \leq 1$.

Gain control circuit 12 multiplies the video signal with DC components removed by removing unit 2, by parameter α set therein as its gain. Gain control circuit 13 multiplies the output signal from frame memory 11, by parameter (1−α) set therein as its gain.

Here, the ratio of the video signal with DC components removed by removing unit 2 to the output signal from frame memory 11 varies depending on the value of parameter α. Therefore, the adjustment unit including gain control circuits 12 and 13 adjusts the ratio of the video signal to the output signal.

Adder circuit 14 adds up the output signal, in which the ratio for adjustment was adjusted the ratio by the adjustment unit, and the video signal and supplies the resultant to frame memory 11. Thereby, the video signal input to frame memory 11 is added to the video signal after one frame period, and the resultant video signal is input to frame memory 11 once again. Accordingly, adder circuit 14 adds up the latest video signal and the sum of video signals up to one frame period ago, so that the resultant summation gives the integration signal.

Herein, adjustment of parameter α, which is the ratio based on which the adjustment unit determines the adjustment, makes it possible to produce the video signal that is suited to the afterimage characteristic of display unit 100. Specifically, the time taken for an afterimage to appear from when the video image changed differs depending on the type of display unit 100, the apparatus configuration and the like. If the proportion of the past video signals that occupy in the integration signal becomes greater the longer the time is, it is possible to efficiently suppress the afterimage. Accordingly, it is preferred that parameter α be set smaller since the time taken for an afterimage to appear from when the video image changed is longer.

Subtracting unit 4 includes gain control circuit 21 and adder circuit 22.

Gain control circuit 21 adjusts the amplitude of the integration signal generated by integrating unit 3. Specifically, gain control circuit 21 is set with a parameter β. Gain control circuit 21 multiplies the amplitude of the integration signal by parameter β set therein as a gain and inverts the polarity of the integration signal so as to multiply the integration signal by (−β). Here, parameter β is 0 or greater.

Adjustment of parameter β which determines the amount of adjustment of gain control circuit 21 makes it possible to produce the video signal that is suited to the afterimage characteristic of display unit 100. Specifically, the intensity of the afterimage becomes different depending on the type of display unit 100, the apparatus configuration and the like. In a situation in which the stronger the afterimage, the greater is the amount of adjustment, it is possible to sufficiently suppress the afterimage. Accordingly, it is preferred that parameter β is set smaller as the afterimage is stronger.

Adder circuit 22 adds the integration signal whose the amplitude was adjusted by gain control circuit 21 to the video signal received by input terminal 1. Here, since the polarity of the integration signal is inverted at gain control circuit 21, subtracting unit 4 functions to subtract the integration signal generated by integrating unit 3 from the video signal.

Measuring unit 5 measures the non-activation time in which no current is supplied to display unit 100.

For example, measuring unit 5 includes a backup power source and a clock (or timer) that is driven by the backup power source. Measuring unit 5 measures the time from when current supply to display unit 100 is stopped until current supply is restored, as the non-activation time. Alternatively, measuring unit 5 may measure the amount of discharge from the capacitor included in display unit 100 or afterimage correcting circuit 10 and may determine the time corresponding to the amount of discharge to measure the non-activation time.

Adjustment unit 6 adjusts parameter fi that is the amount of adjustment at gain control circuit 21 and parameter α that is the ratio based on which the adjustment unit makes adjustment, in accordance with the non-activation time measured by measuring unit 5.

Specifically, adjusting unit 6 makes parameter β smaller as the non-activation time becomes longer, so as to make the amount of adjustment at gain control circuit 21 smaller. Further, adjusting unit 6 makes parameter α smaller as the non-activation time becomes longer, so as to cause the adjustment unit adjust the ratio of the amplitude.

In this way, subtracting unit 4 functions to adjust the amplitude of the integration signal in accordance with the non-activation time measured by measuring unit 5. More specifically, the longer the non-activation time, the smaller is the amplitude of the integration signal that is set by subtracting unit 4.

The adjustment unit functions to adjust the ratio of the amplitude of the video signal with DC components that have been removed by removing unit 2, to the amplitude of the output signal from frame memory 11, in accordance with the non-activation time measured by measuring unit 5. More specifically, the longer the non-activation time, the smaller the ratio between the amplitude that is set by the adjustment unit.

Next, the operation will be described.

Figure 4:
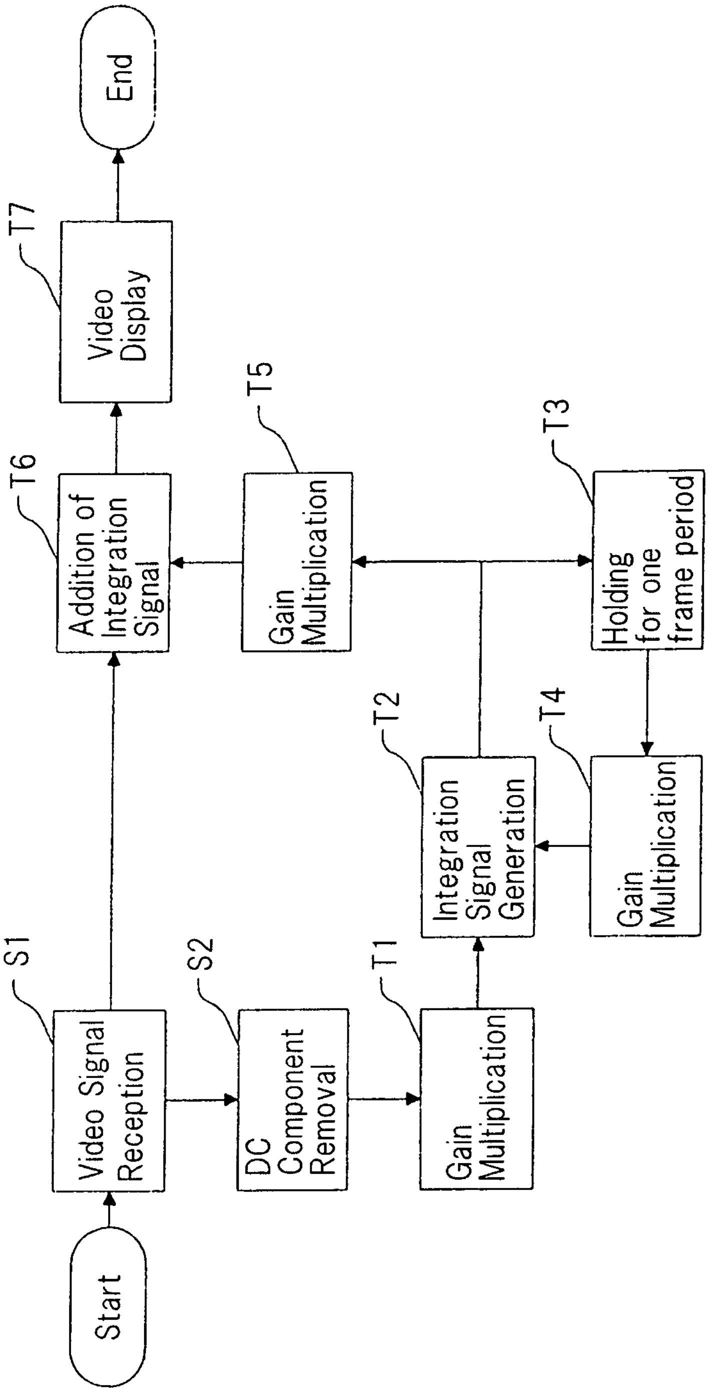
FIG. 4 is a flow chart for explaining an operational example of a video display apparatus of the second exemplary embodiment of the present invention.

FIG. 4 is a flow chart for explaining an operational example of the present exemplary embodiment. In FIG. 4, the same processes as those in HG. 3 are allotted with the same reference numerals.

To begin with, Steps S1 and S2 are implemented. Then, gain control circuit 12 of integrating unit 3, which receiving the video signal output from removing unit 2 at Step S2, multiplies the video signal by parameter α set therein as a gain and outputs the result to adder circuit 14 (Step T1).

Adder circuit 14, which receiving the video signal from gain control circuit 12, receives the integration signal that is the summation of the video signals up to the previous frame, from gain control circuit 13. Adder circuit 14 adds up the video signal and the integration signal to produce the latest integration signal. Adder circuit 14 inputs the integration signal into frame memory 11 and also outputs the integration signal to gain control circuit 21 (Step T2).

Frame memory 11 holds the input integration signal in one frame period and then outputs the held integration signal to gain control circuit 13 (Step T3).

Gain control circuit 13, which receiving the integration signal, multiplies the integration signal by parameter (1−α) set therein as a gain. Adder circuit 14 outputs the integration signal multiplied by the gain to adder circuit 14 (Step T4).

Gain control circuit 21, which receiving the integration signal, multiplies the integration signal by parameter β set therein as a gain and inverts the polarity of multiplication result to have the amplitude of the integration signal multiplied by (−β). Gain control circuit 21 outputs the integration signal with its amplitude multiplied by (−β) to adder circuit 22 (Step T5).

Then, adder circuit 22 receives the integration signal from gain control circuit 21, and receives the video signal output at Step S1 from input terminal 1 to subtracting unit 4. Adder circuit 22 adds up the video signal and the integration signal to generate a video signal with afterimages removed, and outputs the generated video signal to display unit 100 (Step T6).

Display unit 100, which receiving the video signal, displays the video image in accordance with the video signal (Step T7).

Figure 5:
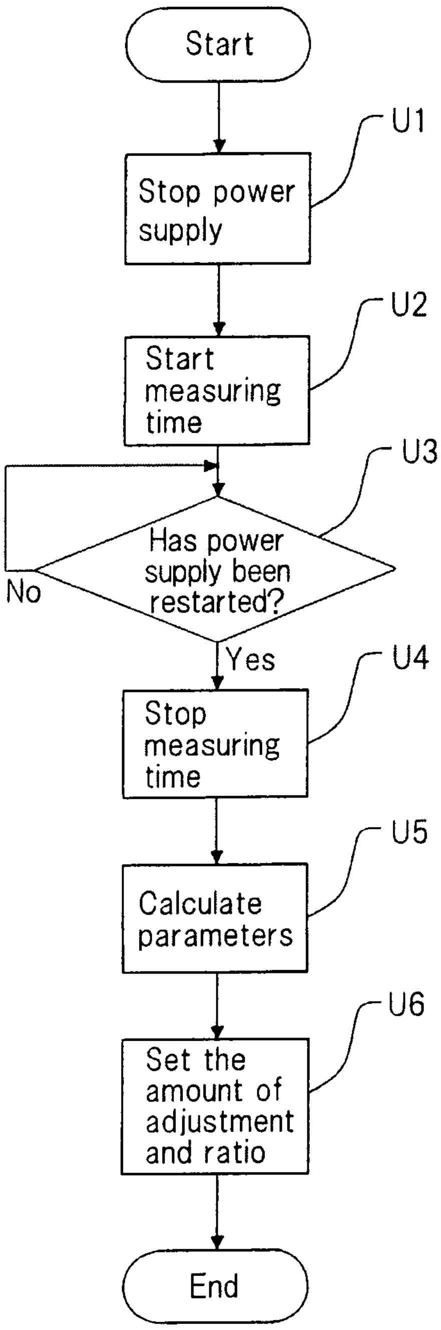
FIG. 5 is a flow chart for explaining another operational example of a video display apparatus of the second exemplary embodiment of the present invention.

Next, the operation when power supply to display unit 100 is suspended will be described. FIG. 5 is a flow chart for explaining an example of this operation.

First, when detecting the suspension of power supply to display unit 100 (Step U1), measuring unit 5 starts measuring time using a clock thereof (Step U2).

Measuring unit 5 checks whether the power supply to display unit 100 has been restarted (Step U3).

Measuring unit 5 returns to Step U3 if power supply to display unit 100 has not been restarted (No at Step U3). On the other hand, when power supply to display unit 100 is restarted (Yes at Step U3), measuring unit 5 stops measuring time and outputs the measurement of time as a signal representing non-activation time, to adjustment unit 6 (Step U4).

Adjustment unit 6, as receiving the signal, calculates parameters α and β in accordance with the non-activation time indicated by that signal. Specifically, parameter α is made smaller by adjustment unit 6, and the longer the non-activation time the smaller is the value set for parameter β by adjustment unit 6. For example, adjustment unit 6 holds respective initial values of parameters α and β, and the longer the non-activation time the smaller are the values used for multiplying the initial values by adjustment unit 6 to calculate parameters α and β.

Here, it is preferable that the initial value of parameter α be set beforehand so as to take a smaller value since the time taken for an afterimage to appear on display unit 100 from when the video changed becomes longer. Also, it is preferable that the initial value of parameter β be set beforehand so as to take a smaller value since the amplitude of the afterimage becomes greater on display unit 100.

Adjustment unit 6 outputs α-signal that represents gain α to gain control circuit 12, outputs (1−α)-signal that represents gain (1−α) to gain control circuit 13, and outputs β-signal that represents gain β to gain control circuit 21 (Step U5).

Gain control circuit 12, which receives α-signal, sets itself with gain α indicated by that α-signal. Gain control circuit 13, which receives (1−α -signal, sets itself with gain (1−α indicated by that (1−α)-signal. Gain control circuit 21, which receives a-signal, sets itself with gain β indicated by that β-signal (Step U6).

Next, the effect will be described.

In the present exemplary embodiment, measuring unit 5 measures the non-activation time in which no power is supplied to display unit 100. Subtracting unit 4 adjusts the amplitude of the integration signal in accordance with the non-activation time and subtracts the adjusted integration signal from the video signal. It should be noted that there may occur cases where the condition of afterimage arising on display unit 100 is better during the period in which display unit 100 is deactivated.

In this case, it is possible to inhibit the integration signal for the improved afterimage from being subtracted from the video signal. Accordingly, it is possible to suppress occurrence of overcorrection, hence suppress degradation of image quality more effectively.

In the present exemplary embodiment, subtracting unit 4 makes the amplitude of the integration signal smaller the longer the non-activation time is. It is noted that the longer the non-activation time, the more the afterimage is improved.

In this case, because the higher the degree of improvement that is made against afterimage, the smaller is the amplitude of the integration signal, it is possible to suppress occurrence of overcorrection in a more exact manner.

Further, in the present exemplary embodiment, frame memory 11 outputs the input signal after holding the signal in one frame period. The adjustment unit adjusts the ratio of the amplitude of the output signal from frame memory 11 to the amplitude of the video signal with DC components removed by removing unit 2, in accordance with the non-activation time. Adder circuit 14 adds up the output signal adjusted by the adjustment unit and the video signal and supplies the result to frame memory 11 to thereby achieve integration of the video signal.

In this case, the proportion of the past integration signals included in the latest integration signal can be changed in accordance with the non-activation time. The afterimages produced by the past integration signals are bettered in accordance with the non-activation time, so that it is possible to change the proportion of the past integration signals included in the integration signal, in accordance with the degree of improvement of afterimages. Accordingly, it is possible to suppress occurrence of overcorrection much more, so that degradation of image quality can be suppressed much more.

Moreover, in the present exemplary embodiment, the longer the non-activation time, the smaller is the ratio of the amplitude of the output signal from frame memory 11 to the video signal with DC components removed that is made by the adjustment unit.

In this case, the higher the degree of improvement that is made against the afterimage, it is possible that the ratio that is made of the past integration signals included in the last integration signal becomes smaller.

Though the present invention has been described heretofore by referring to exemplary embodiment, the present invention should not be limited to the above exemplary embodiment. Various changes that will be understood by those skilled in the art can be added to the configurations and details of the present invention within the scope of the present invention.

For example, parameters α and β may be previously determined values.

Integrating unit 3 may have only one circuit from gain control circuits 12 and 13.

Further, as the holding means, a field memory that holds the video signal in one field period may be used. Here, display unit 10 usually displays one frame of an image by scanning twice in a certain direction when a video image is displayed in accordance with the video signal. One field period is the duration to be taken to scan one time in this direction. One frame period corresponds to the duration to be taken to scan two times in this direction.

The invention claimed is:

1. A video display apparatus comprising:

an input unit that receives a video signal;

a removing unit that removes DC components from the video signal received by said input unit;

an integrating unit that generates an integration signal by integrating the video signal with said DC components removed by said removing unit;

a subtracting unit that subtracts the integration signal generated by said integrating unit, from the video signal received by said input unit;

a display unit that displays video in accordance with the video signal undergoing subtraction at said subtracting unit; and a measuring unit that measures a non-activation time, said non-activation time comprising a time from when a current supply to said display apparatus is stopped, until the current supply is restored, in which said display unit is not activated, wherein said removing unit removes said DC components which are calculated based on an average value of a brightness of the video signal in a frame period, and wherein said subtracting unit adjusts an amplitude of the integration signal in accordance with the non-activation time measured by said measuring unit, and subtracts the integration signal whose amplitude is adjusted from the video signal.

2. The video display apparatus according to claim 1, wherein the non-activation time is inversely proportional to the amplitude of the integration signal that is set by said subtracting unit.

3. The video display apparatus according to claim 1, wherein said integrating unit includes:

a holding unit that outputs the input signal after holding the signal for a predetermined period;

an adjusting unit that adjusts a ratio of an amplitude of the output signal from said holding unit to an amplitude of the video signal with DC components removed by said removing unit, in accordance with the non-activation time measured by said measuring unit; and an adder unit that adds up the output signal adjusted by said adjusting unit and the video signal, to generate the integration signal, and inputs the integration signal into said holding unit.

4. A video display apparatus comprising:

an input unit that receives a video signal;

a removing unit that removes DC components from the video signal received by said input unit;

an integrating unit that generates an integration signal by integrating the video signal with said DC components removed by said removing unit;

a subtracting unit that subtracts the integration signal generated by said integrating unit, from the video signal received by said input unit;

a display unit that displays video in accordance with the video signal undergoing subtraction at said subtracting unit; and a measuring unit that measures a non-activation time, said non-activation time comprising a time from when a current supply to said display apparatus is stopped, until the current supply is restored, in which said display unit is not activated, wherein said removing unit removes said DC components which are calculated based on an average value of a brightness of the video signal in a frame period, and wherein said integrating unit includes:

a holding unit that outputs the input signal after holding the signal for a predetermined period;

an adjusting unit that adjusts a ratio of an amplitude of the output signal from said holding unit to an amplitude of the video signal with DC components removed by said removing unit, in accordance with the non-activation time measured by said measuring unit; and an adder unit that adds up the output signal adjusted by said adjusting unit and the video signal, to generate the integration signal, and inputs the integration signal into said holding unit.

5. The video display apparatus according to claim 3, wherein the non-activation time is inversely proportional to the ratio between the amplitudes that are set by said adjusting unit.

6. The video display apparatus according to claim 1, wherein, to remove the DC component from the video signal, said removing unit subtracts said average value from the video signal.

7. The video display apparatus according to claim 1, wherein said integrating unit integrates said video signal by summing the video signal for each of a plurality of frame periods.

8. The video display apparatus according to claim 1, wherein as said non-activation time increases, said subtracting unit decreases an amplitude of the integration signal.

9. The video display apparatus according to claim 3, wherein when a power supply to the video display apparatus is stopped, said measuring unit stops measuring time and outputs the measurement of time as a signal representing non-activation time to said adjustment unit.

10. The video display apparatus according to claim 9, wherein said adjustment unit, receiving the signal representing non-activation time, calculates a first parameter and a second parameter in accordance with the non-activation time indicated by the signal.

* * * * *